Sept. 25, 1956  W. R. CADY ET AL  2,764,472
BRINE PURIFICATION
Filed June 16, 1954
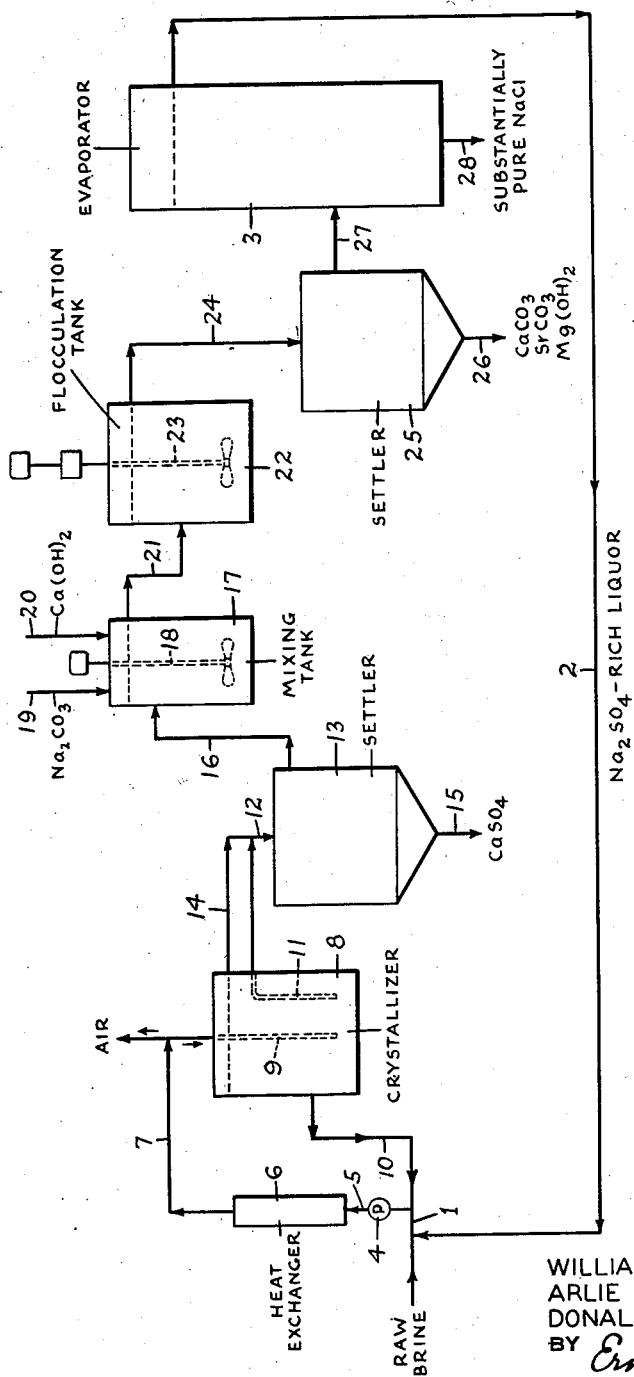
INVENTORS.
WILLIAM R. CADY
ARLIE P. JULIEN
DONALD J. SAUNDERS
BY Ernest A. Polin
ATTORNEY.

United States Patent Office 2,764,472
Patented Sept. 25, 1956

2,764,472
BRINE PURIFICATION

William R. Cady, Allen Park, Mich., and Arlie P. Julien and Donald J. Saunders, Syracuse, N. Y., assignors to Allied Chemical & Dye Corporation, New York, N. Y., a corporation of New York Application June 16, 1954, Serial No. 437,167

3 Claims. (Cl. 23—42)

This invention relates to the purification of sodium chloride brines and more particularly refers to a new and improved process for the removal of calcium sulfate, as well as calcium chloride, magnesium chloride and strontium sulfate, from sodium chloride brines.

In the electrolysis of sodium chloride in mercury cathode cells to produce chlorine and sodium hydroxide, sodium chloride brine is generally passed through the cell under conditions such that as much as 30% to 50% of the sodium chloride is decomposed by the electrolysis. To replenish supply of consumed salt, high purity sodium chloride is added to the circulating brine. This salt is usually made by evaporation of brine obtained from brine wells in saturated or nearly saturated solution, followed by purification to remove contaminants. Representative brines contain from 250 to 310 grams per liter of sodium chloride, from 1.5 to 5.1 grams per liter of calcium sulfate, from 0.2 to 2.3 grams per liter of calcium chloride, from 0.05 to 0.64 gram per liter of magnesium chloride and from 0.02 to 0.12 gram per liter of strontium sulfate.

In the recovery of sodium chloride from sodium chloride brines, the brine is concentrated by evaporation until the salts contained therein are precipitated and thus recovered. During the evaporation calcium sulfate and other impurities, if present, are deposited on the heating tubes or the walls of the evaporating vessel, thereby impeding the transfer of heat and, in some cases, even impairing the flow of the liquor in the evaporation apparatus. Frequent removal of the deposits is necessary. Shut-downs of the operation are extremely costly because of the labor and materials involved, shortened life of heater tubes, and the loss in productivity of the apparatus. Hence, it is of extreme importance to effect removal of the brine impurities prior to evaporation of the brine.

It has been suggested to remove calcium compounds, as well as magnesium and strontium compounds, from brine by addition of sodium carbonate and calcium hydroxide which precipitate calcium and strontium as carbonates and magnesium as hydroxide. The precipitated solids are settled out and removed to produce a clear brine for evaporation. This process, however, does not remove sulfate from the brine. Two alternatives have been available for the removal of the sulfate. One, the sulfate-rich brine can be discarded. This, however, is unsatisfactory not only economically but also because of the necessity of avoiding stream pollution. Two, the brine can be treated with calcium chloride to remove the sulfate as calcium sulfate and the treated brine returned to the purification step. The latter alternative, of course, requires the additional expense of calcium chloride reagent. Also, the solubility of resultant calcium sulfate in brine makes impracticable the prospect of its complete removal by this procedure.

Further, it has been suggested to add sodium sulfate to the brine to cause a portion of the calcium sulfate to be separated in the form of gypsum ($CaSO_4.2H_2O$), and then to remove residual calcium sulfate by treatment, e. g., with sodium carbonate. The reaction which produces the gypsum does not proceed in the brine except at relatively moderate temperatures. At suitable temperatures extremely long contact times are necessary in order to effect maximum precipitation of the calcium sulfate as gypsum. Even with maximum precipitation, the solubility of gypsum in brine is such that disappointingly low proportions of total calcium appear as precipitate. As delivered at well head, raw brine may be hot. When so, it must be cooled before maximum conversion of its calcium content to gypsum can be realized. Such cooling and the necessity for long reaction times represent substantial investment, operating, maintenance and depreciation values which it would be highly desirable to avoid. Attempts to improve operation by addition of precipitation and settling accelerators of suitable chemical compatibility to the brine contents have resulted in but nominal changes having no substantial favorable effect upon economy or purity of product.

One object of the present invention is to provide a simple and economical continuous process for removing calcium sulfate and other impurities from sodium chloride brines containing the same.

Another object of this invention is to provide a continuous process for removing calcium sulfate and other impurities from sodium chloride brines in a shorter time with decreased reagent requirements.

Still another object is to achieve maximum purity of sodium chloride.

Other objects and advantages will be apparent from the following description.

In accordance with our invention, raw sodium chloride brine containing calcium sulfate, calcium chloride, magnesium chloride and strontium sulfate is treated continuously with sodium sulfate at a temperature of about 60° to 100° C. The sodium sulfate and raw brine are maintained at temperature within that range, e. g. at about 80° C., for an hour or less, often a half hour or less, and resultant insoluble calcium sulfate compound is recovered from the heated brine by settling and decantation. We have discovered, contrary to expectation, that by effecting reaction between sodium sulfate and the raw brine within the range of temperatures indicated a considerable proportion of the dissolved calcium present is converted very rapidly to insoluble calcium sulfate compound. As a result, there remains dissolved a minimum of residual calcium compounds requiring use of reagents to convert them to insoluble compound form. Moreover, the insoluble calcium sulfate compound forms as relatively large, fast settling crystals. If temperature outside this range be employed, the quantity of easily separated calcium sulfate compound precipitated is reduced. Carrying out the reaction at temperature within this range for periods in excess of about an hour fails to result in substantial further improvement in quantity or quality of precipitate.

In effecting the calcium sulfate compound precipitation in accordance with the invention, this compound occurs as calcium sulfate hemihydrate ($CaSO_4.\frac{1}{2}H_2O$), glauberite ($CaSO_4,Na_2SO_4$) or a mixture of these solids, depending upon the concentration of sulfate ion in the sulfate liquor used for reaction with the raw brine. Thus, the calcium sulfate compound precipitation step of the invention serves the additional purpose of removing from the reaction system excess sulfate ion, if present.

In preferred operation, the mother liquor remaining after decantation from the settled calcium sulfate compound is treated, while still at elevated temperature, preferably within or somewhat above the aforesaid range, with an alkali metal carbonate and a member of the group consisting of alkali metal and alkaline earth metal hydroxides. This treatment precipitates in quickly settling form residual calcium and strontium as carbonates and magnesium as hydroxide. After separation of the precipitate, the resultant mother liquor is evaporated, yielding substantially pure sodium chloride crystals. The sodium chloride crystals are then separated from mother liquor which contains sodium sulfate, resulting at least in part from the reactions which produced the precipitate last mentioned. This sodium sulfate-rich mother liquor is recycled to the calcium sulfate crystallization step where reduction in sulfate content of the mother liquor is effected.

According to a preferred aspect of our invention, a continuous system for purification of sodium chloride brines is carried out by treating the impure sodium chloride brine with mother liquor containing sodium sulfate, obtained during subsequent evaporation step, at a temperature of about 90°–100° C. and for a period of not more than about one-half hour, thereby effecting crystallization of part of the calcium sulfate as calcium sulfate hemihydrate and/or glauberite, separating the calcium sulfate crystals, treating the resultant mother liquor with an alkali metal carbonate such as sodium carbonate and a member of the group consisting of alkali metal and alkali earth metal hydroxides such as calcium hydroxide at a temperature of about 80°–110° C., thereby precipitating residual calcium and strontium as carbonates and magnesium as hydroxide, separating the precipitate, evaporating the resultant purified brine to obtain substantially pure sodium chloride crystals, separating the sodium chloride crystals, and recycling the resultant mother liquor containing sodium sulfate to the calcium sulfate crystallization step.

Referring to the flow sheet shown in the accompanying drawing, an impure sodium chloride brine comprising, for example, 300 grams per liter sodium chloride, 4.3 grams per liter calcium sulfate, 0.6 gram per liter calcium chloride, 0.07 gram per liter magnesium chloride, and 0.02 gram per liter strontium sulfate, is introduced to line 1. In line 1 the brine combines with mother liquor containing up to about 50 grams per liter of sodium sulfate which has been recycled through line 2 from evaporator 3. The combined liquor, preferably containing sodium sulfate in amount sufficient to react with the calcium chloride and magnesium chloride in the brine and to form a mixture having a sodium sulfate concentration of about 4 to 12 grams per liter, is pumped by means of pump 4 through line 5 to heat exchanger 6 wherein the liquor is heated to a temperature of about 60°–100° C., preferably 90°–100° C. The heated liquor passes through line 7 to the bottom of crystallizer 8 via a centrally located pipe 9. Coarse crystals of calcium sulfate hemihydrate ($CaSO_4 \cdot \frac{1}{2}H_2O$) and/or glauberite ($CaSO_4 \cdot Na_2SO_4$), depending on the concentration of sodium sulfate, are formed and settle to the bottom of crystallizer 8. After initial formation of the calcium sulfate compound crystals they act as seed crystals for newly introduced liquor. A portion of the coarse calcium sulfate compound crystals is recirculated through line 10, pump 4, line 5, heat exchanger 6, line 7 and pipe 9 to the bottom of crystallizer 8. The excess calcium sulfate crystals are withdrawn through lines 11 and 12 to a settler 13, which may be a conventional bell settler. Overflow liquor containing fine crystals of calcium sulfate passes from the upper part of crystallizer 8 through lines 14 and 12 to settler 13. In settler 13 the calcium sulfate crystals are allowed to settle and are withdrawn through line 15. During the crystallization air passes out of crystallizer 8 via pipe 9.

As indicated above, by carrying out the calcium sulfate compound crystallization step at a temperature of about 60°–100° C., and preferably at about 90°–100° C., calcium sulfate hemihydrate and/or glauberite are formed. In practice of the invention, considerable separation of calcium sulfate impurity is realized as evidenced by retention of a maximum of 2 to 3 grams per liter of calcium sulfate in solution. To achieve this result, contact times of not more than one hour, and usually not more than one-half hour, are suitable. Such brief contact times have not before been achieved by the art and represent a distinct economic advantage in operation of a commercial process.

Clear partially purified brine passes through line 16 to mixer 17 provided with conventional agitator 18. An alkali metal carbonate such as sodium carbonate, generally in the form of an aqueous solution, is introduced to mixer 17 through line 19. An alkali metal or alkali earth metal hydroxide such as calcium hydroxide or sodium hydroxide is introduced to mixer 17 through line 20. In order to readily control the flow of the hydroxide into the mixer and to avoid undue dilution of the brine with water, we prefer to introduce the hydroxide diluted with purified brine. To accomplish the most effective removal of impurities still present in the brine, it is advisable to employ the precipitating reagents in amounts in slight excess of those indicated by the stoichiometrical requirements. Such stoichiometrical requirements can be calculated from an analysis of the partially purified raw brine as to the soluble calcium, magnesium and strontium content. The mixture is maintained at an elevated temperature, preferably at a temperature of about 80°–110° C., by use of any conventional heating means such as a heating jacket, if required. The contents of the mixer then passes through line 21 to flocculator 22 supplied with slow speed agitator 23. In flocculator 22, substantially all of the remaining calcium, magnesium and strontium compounds are precipitated in flocculent form, the calcium and strontium as carbonates and the magnesium as hydroxide. It has been found that too rapid agitation will break up the flocculent precipitate and give poor settling. From flocculator 22 the mixture flows through line 24 to a settler 25, which may be a conventional bell settler. The precipitate of calcium carbonate, strontium carbonate and magnesium hydroxide is allowed to settle in settler 25 and is then withdrawn through line 26.

We have found that use of elevated temperatures, preferably in the range of about 80°–110° C., in the precipitation of residual impurities in the brine has resulted in certain marked improvements in operation, such as very rapid settling, usually of 30 feet per hour or better, as well as high rate of reaction, as evidenced by the formation of the flocculated precipitate, usually in less than 5 minutes.

Further, in practice of the precipitation step of our process, efficiency of the removal of the residual impurities from the brine is also improved. For example, residual calcium has been reduced to about 0.005 gram or less per liter, about a third or less of calcium contents obtained by known processes. Residual magnesium content of the mother liquor as low as 1.2 mgs. per liter are easily obtained, a reduction of about 50% as compared with older practices. Residual strontium contents of as low as 0.7 mg. per liter, 15–20% of those obtained heretofore, are ordinarily realized. It is thus evident that our process results in substantial savings in reagents for more complete removal of residual impurities.

Clear purified brine is withdrawn from settler 25 and passed through line 27 to evaporator 3. Although a single effect evaporator is shown in the drawing, it is desirable for the sake of efficiency to employ a multiple effect evaporator. In evaporator 3 the liquor is subjected to evaporation to form substantially pure sodium chloride crystals which are withdrawn through line 28. Mother liquor containing such sodium sulfate as may remain after the calcium sulfate crystallization step, and sodium sulfate formed in the reaction of the residual calcium sulfate and strontium sulfate with sodium carbonate, is withdrawn from the evaporator and recycled through line 2 to the calcium sulfate crystallization step. Although it is not usually necessary, additional sodium sulfate may be introduced as such into the system.

In normal operation of the invention, a balanced cyclic system is usually obtained in that the weight of sodium sulfate leaving the final precipitation step is adequate to achieve maximum precipitation of calcium sulfate compound in the first of such steps. Normally, sodium sulfate in excess of the requirements for the first step forms part of the precipitate there formed and is withdrawn from the system with that precipitate.

It will be understood that the details hereinbefore set forth are for the purposes of illustration only and that the invention as described is to be limited only by the appended claims.

We claim:

1. A continuous process for producing substantially pure sodium chloride crystals from sodium chloride brine containing dissolved therein calcium sulfate, calcium chloride, magnesium chloride and strontium sulfate which comprises introducing sodium sulfate into said brine, reacting the introduced sodium sulfate with said brine at a temperature of 60°–100° C. and for a period of not more than about one hour, thereby forming crystalline calcium sulfate compound of the group consisting of calcium sulfate hemihydrate, glauberite and mixtures thereof, separating said calcium sulfate compound, treating the resultant mother liquor with an alkali metal carbonate and a member of the group consisting of alkali metal hydroxides and alkali earth metal hydroxides at a temperature of 60°–110° C., thereby precipitating calcium carbonate, strontium carbonate and magnesium hydroxide and producing sodium sulfate, separating said precipitate, evaporating the resultant mother liquor to yield the desired substantially pure sodium chloride crystals and sodium sulfate-containing solution, separating the sodium chloride crystals from said solution, and introducing the latter into the brine to serve as source of sodium sulfate.

2. A continuous process for producing substantially pure sodium chloride crystals from sodium chloride brine containing calcium sulfate, calcium chloride, magnesium chloride and strontium sulfate which comprises introducing sodium sulfate into said brine, reacting the introduced sodium sulfate with said brine at a temperature of about 90°–100° C. and for a period of not more than about one-half hour, thereby effecting crystallization of part of the calcium sulfate, separating said calcium sulfate crystals, treating the resultant mother liquor with an alkali metal carbonate and a member of the group consisting of alkali metal hydroxides and alkali earth metal hydroxides at a temperature of about 80°–110° C., thereby effecting precipitation of substantially all of the remaining calcium and strontium as carbonates and magnesium as hydroxide, separating said precipitate, evaporating the resultant mother liquor to yield the desired substantially pure sodium chloride crystals and sodium sulfate-containing solution, separating the sodium chloride crystals from said solution, and introducing the latter into the brine to serve as source of sodium sulfate.

3. A continuous process for producing substantially pure sodium chloride crystals from sodium chloride brine containing calcium sulfate, calcium chloride, magnesium chloride and strontium sulfate which comprises treating said brine with sodium sulfate at a temperature of about 90°–100° C. and for a period of not more than about one-half hour, said sodium sulfate being added in amount sufficient to react with the calcium chloride and magnesium chloride in the brine and to form a mixture having a sodium sulfate concentration of about 4 to 12 grams per liter, thereby effecting crystallization of part of the calcium sulfate, separating said calcium sulfate crystals, treating the resultant mother liquor with sodium carbonate and calcium hydroxide at a temperature of about 80°–110° C., thereby effecting precipitation of substantially all of the remaining calcium and strontium as carbonates and magnesium as hydroxide, separating said precipitate, evaporating the resultant mother liquor to form substantially pure sodium chloride crystals, separating said sodium chloride crystals, and recycling the resultant mother liquor containing sodium sulfate to the calcium sulfate crystallization step.

References Cited in the file of this patent

UNITED STATES PATENTS

| Number | Name | Date |
|---|---|---|
| 304,341 | Mebus | Sept. 2, 1884 |
| 668,671 | Baker et al. | Feb. 26, 1901 |
| 675,686 | Vis | June 4, 1901 |
| 698,341 | Vis | Apr. 22, 1902 |
| 755,415 | Trantom | Mar. 22, 1904 |
| 1,549,018 | Nash | Aug. 11, 1925 |
| 1,597,370 | Freeth et al. | Aug. 24, 1926 |
| 2,516,987 | Hengerer | Aug. 1, 1950 |
| 2,516,988 | Hengerer | Aug. 1, 1950 |
| 2,641,537 | Dunn et al. | June 9, 1953 |
| 2,683,649 | Hirsch | July 13, 1954 |

FOREIGN PATENTS

| Number | Country | Date |
|---|---|---|
| 626,641 | Great Britain | July 19, 1949 |